United States Patent
Le Magoarou (10) Patent No.: US 12,517,211 B2
(45) Date of Patent: Jan. 6, 2026

(54) METHOD AND DEVICE FOR THE RELATIVE POSITIONING OF A PLURALITY OF ELECTRONIC APPARATUSES IN COMMUNICATION WITH A COMMUNICATION DEVICE, AND ASSOCIATED COMMUNICATION SYSTEM

(71) Applicant: FONDATION B-COM, Cesson-Sévigné (FR)

(72) Inventor: Luc Le Magoarou, Thorigné-Fouillard (FR)

(73) Assignee: FONDATION B-COM, Cesson-Sevigne (FR)

( * ) Notice: Subject to any disclaimer, the term of this patent is extended or adjusted under 35 U.S.C. 154(b) by 275 days.

(21) Appl. No.: 18/554,936

(22) PCT Filed: Apr. 14, 2022

(86) PCT No.: PCT/EP2022/060084
§ 371 (c)(1),
(2) Date: Oct. 11, 2023

(87) PCT Pub. No.: WO2022/223457
PCT Pub. Date: Oct. 27, 2022

(65) Prior Publication Data
US 2024/0201313 A1 Jun. 20, 2024

(30) Foreign Application Priority Data
Apr. 23, 2021 (FR) ..................................... 2104239

(51) Int. Cl.
*G01S 5/02* (2010.01)
(52) U.S. Cl.
CPC .......... *G01S 5/0284* (2013.01); *G01S 5/0269* (2020.05)

(58) Field of Classification Search
CPC .............................. G01S 5/0284; G01S 5/0269
(Continued)

(56) References Cited

U.S. PATENT DOCUMENTS

| 10,919,152 B1 * | 2/2021 | Kalouche ............... B25J 9/1697 |
| 2015/0362581 A1 | 12/2015 | Friedman et al. |

(Continued)

FOREIGN PATENT DOCUMENTS

| CN | 105548959 A | * | 5/2016 | ........... G01S 5/0252 |
| CN | 112528779 A | * | 3/2021 | ............... G01S 7/02 |

(Continued)

OTHER PUBLICATIONS

Benyamin Ghojogh et al., "Multidimensional Scaling, Sammon Mapping, and Isomap: Tutorial and Survey", Sep. 17, 2020, 15 pages, arXiv:2009.08136v1 [stat.ML].

(Continued)

*Primary Examiner* — Harry K Liu
(74) *Attorney, Agent, or Firm* — NIXON & VANDERHYE (57) ABSTRACT

A method for relative positioning of electronic apparatuses in communication with a communication device establishing a set of communication channels through which the device exchanges electromagnetic signals with each electronic apparatus includes, for each electronic apparatus, estimating a vector for which the elements represent, respectively, transmission through the communication channels between the device and the respective electronic apparatus, for at least first and second electronic apparatuses, determining a minimum distance from the distances existing, for all possible phase-shift values, between a first vector having a predetermined norm which is colinear to the vector estimated for the first electronic apparatus, and a second vector having the predetermined norm which is colinear to the (Continued)

vector estimated for the second electronic apparatus and modified by applying a phase shift having a value among the possible values, and determining a position indicator for the first electronic apparatus based on the determined distance.

16 Claims, 3 Drawing Sheets

(58) Field of Classification Search
USPC .......................................................... 342/450
See application file for complete search history.

(56) References Cited

U.S. PATENT DOCUMENTS

| | | | |
|---|---|---|---|
| 2020/0267936 A1* | 8/2020 | Tran | ..................... A01K 29/005 |
| 2020/0382228 A1 | 12/2020 | Studer et al. | |

FOREIGN PATENT DOCUMENTS

| | | | | |
|---|---|---|---|---|
| FR | 3006778 A1 | * | 12/2014 | ............. B43K 29/08 |
| TW | 1721614 B | * | 3/2021 | |

OTHER PUBLICATIONS

Christoph Studer et al., "Channel Charting: Locating Users within the Radio Environment using Channel State Information", IEEE Access, vol. 6, Aug. 21, 2018, 15 pages.

E. W. Dijkstra, "A Note on Two Problems in Connexion with Graphs", Numerische Mathematik 1, 1959, 3 pages.

Emre Gönültaş et al., "CSI-Based Multi-Antenna and Multi-Point Indoor Positioning Using Probability Fusion", to appear in IEEE Transactions on Wireless Communications, Sep. 6, 2020, arXiv:2009.02798v1 [eess.SP], 13 pages.

International Search Report w/English translation for PCT/EP2022/060084 mailed Jul. 29, 2022, 5 pages.

Joshua B. Tenenbaum et al., "A Global Geometric Framework for Nonlinear Dimensionality Reduction", Science, vol. 290, No. 5500, Dec. 22, 2000, 5 pages.

Luc Le Magoarou, "Similarity-based prediction for channel mapping and user positioning", IEEE Communications Letters, Jan. 14, 2021, 6 pages.

Mehrzad Biguesh et al., "Training-Based MIMO Channel Estimation: A Study of Estimator Tradeoffs and Optimal Training Signals", IEEE Transactions on Signal Processing, vol. 54, No. 3, Mar. 2006, 10 pages.

Written Opinion of the ISA for PCT/EP2022/060084 mailed Jul. 29, 2022, 6 pages.

* cited by examiner

METHOD AND DEVICE FOR THE RELATIVE POSITIONING OF A PLURALITY OF ELECTRONIC APPARATUSES IN COMMUNICATION WITH A COMMUNICATION DEVICE, AND ASSOCIATED COMMUNICATION SYSTEM

CROSS-REFERENCE TO RELATED APPLICATIONS

This application is the U.S. national phase of International Application No. PCT/EP2022/060084 filed Apr. 14, 2022, which designated the U.S. and claims priority to FR2104239 filed Apr. 23, 2021, the entire contents of each of which are hereby incorporated by reference.

TECHNICAL FIELD OF THE INVENTION

The present invention relates to the technical field of telecommunication.

It relates in particular to a method for the relative positioning of a plurality of electronic apparatuses in communication with a communication device, and an associated communication system.

STATE OF THE ART

The current wireless communication systems need to be able to support a significant volume of exchanged information and of electronic apparatuses involved in these exchanges. This is in particular the case of the so-called MIMO ("Multiple-Input Multiple-Output") systems that comprise a plurality of transmitting antennas and a plurality of receiving antennas. In certain applications, the different receiving antennas respectively correspond to different electronic apparatuses, i.e. to different users. This is in particular the case of the so-called "MU-MIMO" ("Multi User-Multiple-Input Multiple-Output") systems.

In the case of a system comprising a plurality of antennas and in order to optimize the transmission of data in a communication channel, it is for example known from the article: "*Channel charting: locating users within the radio environment using channel state information*", C. Studer, S. Medjkouh, E. Gönültas, T. Goldstein and O. Tirkkonen, IEEE Access, vol. 6, pp. 47 682-47 698, 2018, to determine a location chart for the users of electronic apparatuses communicating via one of the antennas of the system.

However, a charting method as described in the above-mentioned article is relatively complex and relatively expensive to implement in a communication system comprising a great number of antennas because it is based in particular on a step of feature extraction for each of the electronic apparatuses from which the desired chart is generated.

DISCLOSURE OF THE INVENTION

In this context, the present invention proposes a method for the relative positioning of a plurality of electronic apparatuses in communication with a communication device, the communication device establishing a set of communication channels through which the communication device exchanges electromagnetic signals with each of the electronic apparatuses, the method comprising the following steps:

for each electronic apparatus, estimating a vector, the elements of which respectively represent transmission through said communication channels between the communication device and the electronic apparatus in question, for at least one pair of electronic apparatuses comprising a first electronic apparatus and a second electronic apparatus, determining a minimum distance among the distances existing, for all the possible phase-shift values, between a) a first vector having a predetermined norm and colinear to the vector estimated for the first electronic apparatus, and b) a second vector having the predetermined norm, which is colinear to the vector estimated for the second electronic apparatus and modified by application of a phase shift having a value among said possible values, and determining a position indicator for the first electronic apparatus as a function of the determined distance.

A position indicator can then also be determined for the second electronic apparatus, and more generally, for each of the plurality of electronic apparatuses.

Thus, thanks to the use of a minimum distance when applying all the possible phase shifts between the vectors representing the transmission between the first electronic apparatus and the second electronic apparatus, the phase shift liable to effectively exist between these electronic apparatuses due to their location is discarded and thus a distance that is insensitive to the small scale fading phenomenon it thus obtained.

Other non-limiting and advantageous features of the method according to the invention, taken individually or according to all the technically possible combinations, are the following:

for each electronic apparatus, the vector is formed of complex numbers, the module and argument of which represent the attenuation and phase, respectively, of the transmission through a communication channel between the communication device and the electronic apparatus in question;

the minimum distance is determined by the following formula:

$$d^*_{k,l}(h_k, h_l)^2 = 2 - 2\frac{|h_k^H h_l|}{\|h_k\|_2 \|h_l\|_2} \qquad \text{[Math. 1]}$$

with $d^*_{k,l}$ said minimum distance and $h_k$ and $h_l$ the vectors associated with the first electronic apparatus and the second electronic apparatus, respectively;

it is moreover provided a step of determining a distance matrix, at least certain elements of which are the minimum distances respectively determined for said plurality of pairs of electronic apparatuses;

it is further provided a step of size reduction applied to said determined distance matrix;

said position indicator for the first electronic apparatus is a coordinate vector; and the first vector and the second vector are normalized in such a way that their associated predetermined norms are unitary.

The invention also relates to a device for the relative positioning of a plurality of electronic apparatuses in communication with a communication device, the communication device establishing a set of communication channels through which the communication device exchanges electromagnetic signals with each of the electronic apparatuses, the positioning device comprising:

a module for estimating, for each electronic apparatus, a vector the elements of which respectively represent transmission through said communication channels between the communication device and the electronic apparatus in question, a first module for determining, for at least one pair of electronic apparatuses comprising a first electronic apparatus and a second electronic apparatus, a minimum distance among the distances existing, for all the possible phase-shift values, between a first vector having a predetermined norm and colinear to the vector estimated for the first electronic apparatus, and a second vector having the predetermined norm, which is colinear to the vector estimated for the second electronic apparatus and modified by application of a phase shift having a value among said possible values, and a second module for determining a position indicator for the first electronic apparatus as a function of the determined distance.

The invention also relates to a communication system comprising a communication device provided with a positioning device as described hereinabove, and said plurality of electronic apparatuses in communication with the communication device.

Of course, the different features, alternatives and embodiments of the invention can be associated with each other according to various combinations, insofar as they are not mutually incompatible or exclusive.

DETAILED DESCRIPTION OF THE INVENTION

Figure 1:
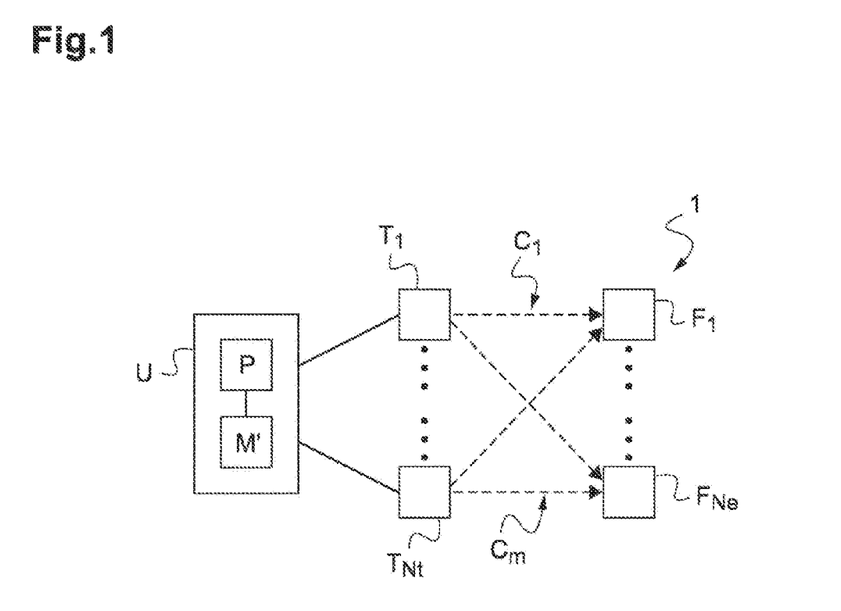
FIG. 1 shows a communication device involved in the present invention.

Moreover, various other features of the invention will be apparent from the appended description made with reference to the drawings that illustrate non-limiting embodiments of the invention, and wherein:

FIG. 1 shows a communication device 1 comprising a set of Nt transmitting antennas $T_1, \ldots, T_{Nt}$.

Each of the transmitting antennas $T_1, \ldots, T_{Nt}$ transmits electromagnetic signals (generally representing data to be transmitted, encoded by symbols) in communication channels $C_1, \ldots, C_m$, where these signals are received by receiving antennas respectively associated with different electronic apparatuses $F_1, \ldots, F_{Ne}$. The different electronic apparatuses are associated with different users. The electronic apparatuses are for example communication terminals. Here, for example, Ne electronic apparatuses are considered.

This situation corresponds in particular to the case of the "MU-MIMO" ("Multi User-Multiple-Input Multiple-Output") systems that comprise a plurality of transmitting antennas $T_1, \ldots, T_{Nt}$ and a plurality of electronic apparatuses $F_1, \ldots, F_{Ne}$, i.e. associated with different users. Each electronic apparatus is provided with its own receiving antenna.

The case considered here is the case in which the transmitting antennas $T_1, \ldots, T_{Nt}$ are connected to a control unit U equipped in particular with a processor P and a memory M'.

The transmission between the communication device 1 and each electronic apparatus $F_n$ is represented by a corresponding vector $h_n$. Each vector $h_n$ is formed of complex numbers, the module and argument of which represent the attenuation and phase, respectively, of the transmission through the different communication channels between the communication device 1 and the electronic apparatus $F_n$ in question. Each communication channel is defined by a transmitting antenna and a sub-carrier.

In practice, each vector $h_n$ comprises Nc elements, where Nc=Nt*Ns with Nt the number of transmitting antennas and Ns the number of sub-carriers considered. Each element of the vector $h_n$ is a complex value function $h_{i,k}$, descriptive of the transmission, through the corresponding communication channel $C_{i,k}$, of the i-th transmitting antenna $T_i$ on the k-th sub-carrier.

Figure 2:
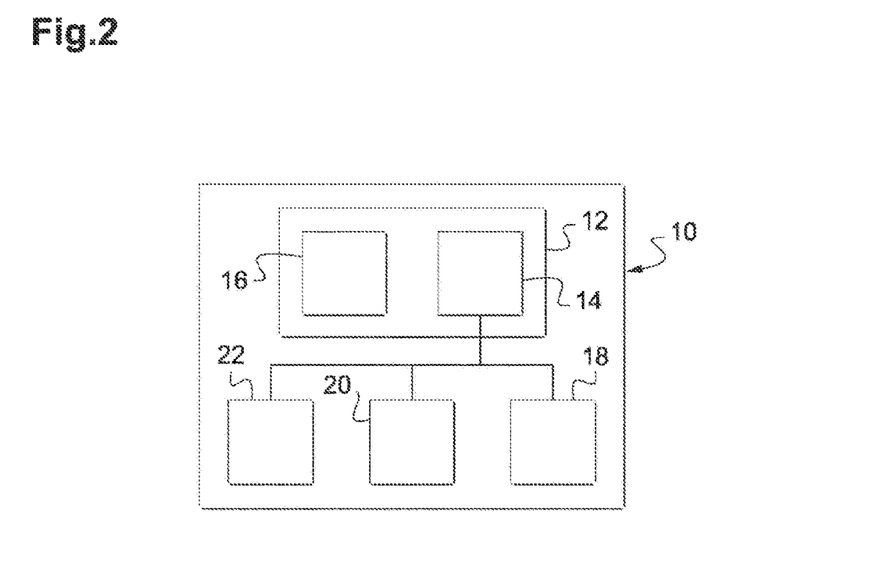
FIG. 2 shows, as a block diagram, a device for the relative positioning of a plurality of electronic apparatuses in communication with the communication device of FIG. 1.

FIG. 2 shows, as a block diagram, a device 10 for the relative positioning of a plurality of electronic apparatuses in communication with the communication device 1 according to an exemplary embodiment of the invention. The positioning device 10 is for example included in the communication device 1.

This positioning device 10 comprises a control unit 12 provided with a processor 14 and a memory 16. The control unit 12 can for example be the same as the control unit U to which are connected the transmitting antennas $T_1, \ldots, T_{Nt}$.

This positioning device 10 also comprises a set of functional modules. For example, it comprises a module 18 for estimating the vector $h_i$, a first module 20 for determining a minimum distance and a second module 22 for determining a position indicator for the electronic apparatuses.

Each of the different modules described is for example made by means of computer program instructions stored in the memory 16 of the control unit 12 and adapted to implement the module in question when these instructions are executed by the processor 14 of the control unit 12.

Figure 3:
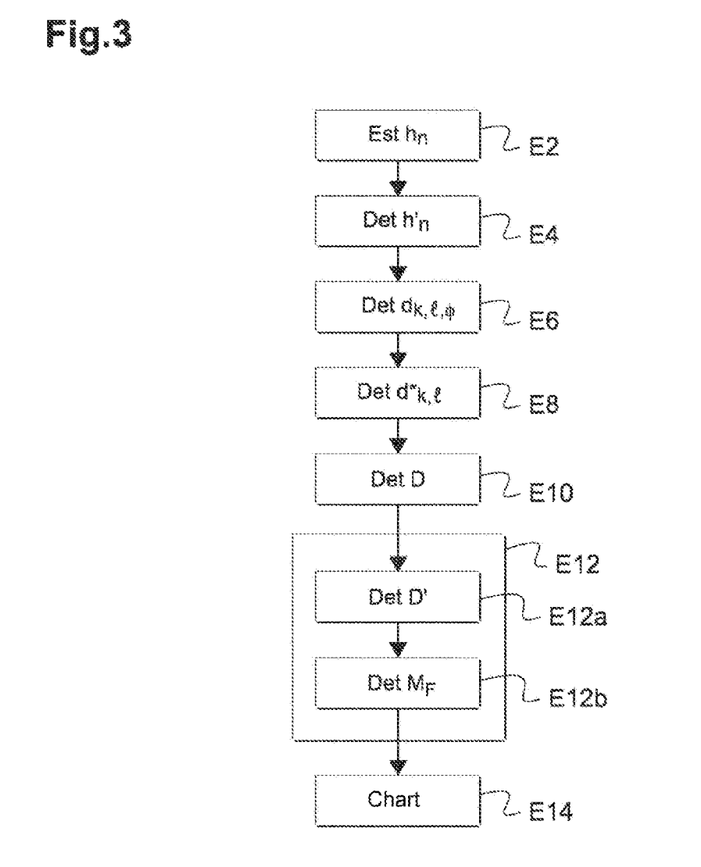
FIG. 3 shows, as a flowchart, an example of positioning method according to the invention.

FIG. 3 is a flowchart showing an example of method for the relative positioning of electronic apparatuses in communication with the communication device 1 implemented in the context described hereinabove.

Previously to the implementation of this method, it is supposed that the communication device 1, and more particularly the transmitting antennas $T_1, \ldots, T_{Nt}$, transmit electromagnetic signals (pilot signals) through the communication channels $C_1, \ldots, C_m$ and to the electronic apparatuses $F_1, \ldots, F_{Ne}$. As an alternative, the electronic apparatuses can transmit pilot signals to the communication device 1.

As shown in FIG. 3, the positioning method begins by a step E2 of estimating, for each electronic apparatus $F_n$, the vector $h_n$ associated with this electronic apparatus for characterizing the transmission of the electromagnetic signals through the communication channels between the communication device 1 and the electronic apparatus $F_n$ in question. This estimation of the vector $h_n$ is made by a channel estimation process such as that described for example in the article "Training-based MIMO channel estimation: a study of estimator tradeoffs and optimal training signals", M. Biguesh and A. B. Gershman, *IEEE transactions on signal processing*, 54(3), 884-893, 2006. This channel estimation process can be implemented based on the pilot signals transmitted by the electronic apparatuses.

Figure 4:
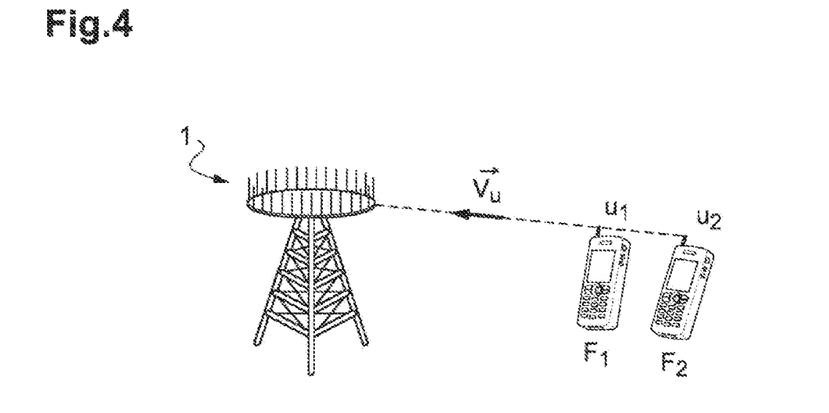
FIG. 4 shows an example of a situation in which the positioning method according to the invention is implemented.

Let's consider the example shown in FIG. 4, schematically representing the situation of two users $u_1$ et $u_2$ (respectively associated with a first and a second electronic apparatus) located in a same direction vu with respect to the communication device 1 and at a distance $d_1$ and $d_2$, respectively, from the communication device 1. In this example, let's consider the transmission of the electromagnetic signals between the communication device 1 and the first and second electronic apparatuses $F_1$, $F_2$.

In this case, at step E2, the vectors $h_1$ and $h_2$ are estimated to respectively characterize the transmission of the electromagnetic signals through the communication channels between the communication device 1, and on the one hand, the first electronic apparatus $F_1$, and on the other hand, the second electronic apparatus $F_2$.

The method then comprises, for each electronic apparatus $F_n$, a step E4 of determining an intermediate vector $h'_n$. This intermediate vector $h'_n$ is colinear to the vector $h_n$ determined at step E2 for the electronic apparatus $F_n$ in question. Moreover, this intermediate vector $h'_n$ is a vector having a predetermined norm. For example, the intermediate vector is normalized in such a way that the predetermined norm is unitary. In other words, the intermediate vector $h'_n$ is a normalized form of the corresponding vector $h_n$.

The intermediate vector $h'_n$ is thus, for example, of the following form:

$$h'_n = h_n / \|h_n\|_2$$

with $\| \ldots \|_2$ the notation corresponding to the Euclidean norm conventionally used.

Considering again the example of FIG. 4, at step E4, are thus determined the first intermediate vector $h'_1$ associated with the first electronic apparatus $F_1$ and the second intermediate vector $h'_2$ associated with the second electronic apparatus $F_2$:

$$h'_1 = h_1/\|h_1\|_2 \ et \ h'_2 = h_2/\|h_2\|_2.$$

As shown in FIG. 3, the method continues at step E6 during which the electronic apparatuses are considered by pairs. Here, for example, the electronic apparatuses $F_k$ and $F_l$ are considered. Step E6 is then a step of determining all the distances existing between, on the one hand, the intermediate vector $h'_k$ associated with the electronic apparatus $F_k$ and, on the other hand, the intermediate vector $h'_l$ associated with the electronic apparatus $F_l$ modified by application of a phase shift of the form $e^{-j\Phi}$ for all the possible phases $\Phi$ in the interval $[0, 2\pi]$.

In practice, the operation of applying the phase shift of the form $e^{-j\Phi}$ amounts to a multiplication by the complex number of unitary module and having for argument said phase value. The application of this phase shift makes it possible to take into account the possible phase shift between the places where the two electronic apparatuses $F_k$ and $F_l$ of the considered pair are located.

In other words, for all the possible phases $\Phi$ in the interval $[0, 2\pi]$, a corresponding set of distances $d_{k,l,\Phi}$ is determined by the following formula:

$$d_{k,l,\phi}(h_k, h_l)^2 = \left\| \frac{h_k}{\|h_k\|_2} - e^{-j\phi} \frac{h_l}{\|h_l\|_2} \right\|_2^2 \qquad [\text{Math. 2}]$$

This set of distances is, as described hereinabove, determined for each considered pair of electronic apparatuses.

In practice, for the example shown in FIG. 4, the set of possible distances $d_{1,2,\Phi}$ for the different phase values $\Phi$ between the first electronic apparatus $F_1$ and the second electronic apparatus $F_2$ is determined by the following formula:

$$d_{1,2,\phi}(h_1, h_2)^2 = \left\| \frac{h_1}{\|h_1\|_2} - e^{-j\phi} \frac{h_2}{\|h_2\|_2} \right\|_2^2 \qquad [\text{Math. 3}]$$

The method then comprises step E8 during which, for the considered pair of electronic apparatuses $F_k$, $F_l$, a minimum distance is determined among all the distances determined at step E6 (for this same pair of electronic apparatuses). In practice, this minimum distance $d^*_{k,l}$ is given by the following formula:

$$d^*_{k,l}(h_1, h_2)^2 = \min_{\phi \in [0,2\pi]} \left\| \frac{h_1}{\|h_1\|_2} - e^{-j\phi} \frac{h_2}{\|h_2\|_2} \right\|_2^2 \qquad [\text{Math. 4}]$$

This minimum distance $d^*_{k,l}$ can also be written as:

$$d^*_{k,l}(h_k, h_l)^2 = 2 - 2 \frac{|h_k^H h_l|}{\|h_k\|_2 \|h_l\|_2} \qquad [\text{Math. 5}]$$

with $| \ldots |$ the notation representing the module of a complex number and $\ldots^H$ the notation corresponding to the "conjugate transpose" operation on the matrix in question.

A demonstration of the equality between formulas [Math. 4] and [Math. 5] is given in the appendix to this description.

As an alternative, steps E4 and E6 could be omitted and the minimum distance $d^*_{k,l}$ between two electronic apparatuses can then be determined directly using formula [Math. 5].

The sequence of steps E6 and E8 is therefore used to determine, for each pair of electronic apparatuses $F_k$, $F_l$, the minimum distance $d'_{k,l}$ between the two electronic apparatuses of the pair considered.

It is therefore possible to obtain, at step E10, a distance matrix D listing all the minimum distances $d^*_{k,l}$ for all the pairs of electronic apparatuses $F_1$, $F_{Ne}$. Each element $d^*_{k,l}$ (row k and column l) of the distance matrix D thus corresponds to the minimum distance between the electronic apparatus $F_k$ and the electronic apparatus $F_l$ as determined at step E8. By definition, the diagonal elements of this distance matrix D are zero.

This distance matrix D is then used to determine the relative positioning of the electronic apparatuses. More precisely, the distances determined between the electronic apparatuses will allow determining a position indicator for each electronic apparatus for which these distances are respected at best for the dimensions of the chosen position indicator. For that purpose, at step E12, a step of size reduction is applied to the distance matrix D.

As shown in FIG. 4, step E12 may comprise a first sub-step of determining geodesic distances from the minimum distances $d^*_{k,l}$ determined hereinabove. In practice, the sub-step E12a is a step of determining a modified matrix D'. An intermediate modified matrix $D_1$ is determined considering the distance matrix D and keeping only a predetermined number of smallest values, for example, per row and/or per column, and setting the other values to a predetermined value. This predetermined value is for example representative of electronic apparatuses considered as distant in the reality. In practice, these other values are not used for the rest of the process.

For example, here, for each row of the distance matrix D, the four elements of smallest values are kept. Then, the modified matrix D' is obtained by application of an algorithm for determining the shortest paths between the elements of the determined intermediate modified matrix $D_1$. This algorithm is for example the Dijkstra algorithm as described in the article "A note on two problems in connection with graphs", E. W. Dijkstra, Numerische Mathematik 1, 269-271, 1959. Each element (row k and column l) of the modified matrix D' corresponds to a so-called geodesic distance between the electronic apparatus $F_k$ and the electronic apparatus $F_l$.

Step E12 then comprises a second sub-step E12b of determining a position indicator of each electronic apparatus based on the modified matrix D' determined at step E12a. This sub-step E12b is based on the solution of an optimization problem, at the end of which the eigenvalue and eigenvector decomposition of the modified matrix D' is obtained.

More precisely, the sub-step E12b aims to determine the matrix $M_F$ defined according to the following expression:

$$M_F = \underset{V \in \mathbb{R}^{d' \times N_e}}{\mathrm{argmin}} \left\| -\frac{1}{2} HD'H - V^T V \right\|_F^2 \quad \text{[Math. 6]}$$

with H the so-called centering matrix that is written as $$H = I_{Ne} - \frac{1}{Ne} e_{Ne} e_{Ne}^T \quad \text{[Math. 7]}$$

with $I_{Ne}$ the Identity matrix, ene the vector defined by $[1 \ldots 1]^T$ of dimension Ne, $\| \ldots \|_F^2$ the notation corresponding to a matrix norm and d' the number of rows of the matrix V (and thus of the matrix $M_F$). More details about the centering matrix H can be found in the article "Multidimensional Scaling, Sammon Mapping, and Isomap: Tutorial and Survey", B. Ghojogh, A. Ghodsi, F. Karray, M. Crowley, 2020.

The position indicator is for example determined from the eigenvalues and eigenvectors of the modified matrix D', for example by selecting the d' greatest eigenvalues and the associated eigenvectors.

In practice, a final matrix $M_F$ containing d' rows and Ne columns is obtained at the end of step E12, the number of columns Ne corresponding to the number of electronic apparatuses considered here. Each column of this final matrix $M_F$ finally corresponds to the position indicator of the electronic apparatus in question. Each position indicator (associated with each electronic apparatus) thus comprises d' elements.

The position indicator is for example a coordinate vector. The number d' is for example chosen as a function of the size of the searched coordinate vector. The number d' is for example between 2 and 4.

More details about this size reduction method (making it possible to obtain the position indicators from the geodesic distance matrix) can be obtained in the article "A global geometric framework for nonlinear dimensionality reduction", J.-B. Tenenbaum, V. De Silva and J. C. Langford, Science, vol. 290, no. 5500, pp. 2319-2323, 2000 and in the article "Multidimensional scaling, sammon mapping, and isomap: Tutorial and survey", B. Ghojogh, A. Ghodsi, F. Karray, and M. Crowley, arXiv preprint arXiv:2009.08136, 2020.

The method is ended by a step E14 of generating a chart representing, on the basis of the position indicators determined at step E12b, the relative positioning of the electronic apparatuses in communication with the communication device 1.

Figure 5:
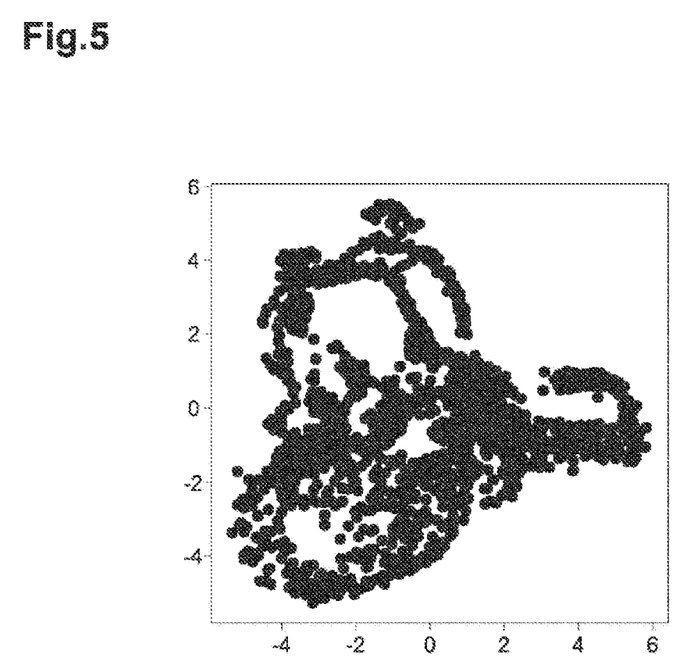
FIG. 5 shows an example of chart obtained when the positioning method according to the invention is implemented.

An example of chart obtained is shown in FIG. 5. In this example, each position indicator has two coordinate elements. The coordinates shown in FIG. 5 thus correspond to the two coordinate elements of each position indicator. Each point of FIG. 5 corresponds to an electronic apparatus $F_1, \ldots, F_{Ne}$. This chart thus allows estimating the relative positioning of the electronic apparatuses with respect to each other. Thus, two close points in FIG. 5 represent two electronic apparatuses that are positioned near to each other in the real situation.

APPENDIX: DEMONSTRATION OF THE FORMULA [MATH. 5]

The formula [Math. 3] can be written as:

$$\left\| \frac{h_k}{\|h_k\|_2} - e^{-j\phi} \frac{h_l}{\|h_l\|_2} \right\|_2^2 = 2 - 2 \frac{Re\{h_k^H e^{j\phi} h_l\}}{\|h_k\|_2 \|h_l\|_2} \quad \text{[Math. 8]}$$

with Re{ ... } the "real part" notation of a complex number and ...$^H$ the notation corresponding to the "conjugate transpose" operation on the matrix in question.

Moreover, by definition of a complex number, it may be noted that:

$$Re\{h_k^H e^{j\phi} h_l\} = \cos(\phi) Re\{h_k^H h_l\} + \sin(\phi) Re\{h_k^H (jh_l)\} \quad \text{[Math. 9]}$$

Squared, the latter expression is given by:

$$Re\{h_k^H e^{j\phi} h_l\}^2 = 2\cos(\phi)\sin(\phi) Re\{h_k^H h_l\} Re\{h_k^H (jh_l)\} + \quad \text{[Math. 10]}$$
$$\cos^2(\phi) Re\{h_k^H h_l\}^2 + \sin^2(\phi) Re\{h_k^H (jh_l)\}^2$$

Knowing that $\cos^2(\Phi) + \sin^2(\Phi) = 1$, equation [Math. 10] can be put into the following form:

$$Re\{h_k^H e^{j\phi} h_l\}^2 = Re\{h_k^H h_l\}^2 + Re\{h_k^H (jh_l)\}^2 - [\sin(\phi) Re\{h_k^H h_l\} - \cos(\phi) Re\{h_k^H (jh_l)\}]^2 \quad \text{[Math. 11]}$$

Moreover, $$Re\{h_k^H h_l\}^2 + Re\{h_k^H (jh_l)\}^2 = |h_k^H h_l|^2 \quad \text{[Math. 12]}$$

and $$[\sin(\phi) Re\{h_k^H h_l\} - \cos(\phi) Re\{h_k^H (jh_l)\}]^2 \geq 0 \quad \text{[Math. 13]}$$

and $$[\sin(\phi) Re\{h_k^H h_l\} - \cos(\phi) Re\{h_k^H (jh_l)\}]^2 = 0 \text{ if } \phi = \arctan\left[\frac{Re\{h_k^H (jh_l)\}}{Re\{h_k^H h_l\}}\right] \quad \text{[Math. 14]}$$

Using the minimum value (zero) of this term, the formula [Math. 5] is then deduced:

$$\min_{\phi \in [0, 2\pi]} \left\| \frac{h_1}{\|h_1\|_2} - e^{-j\phi} \frac{h_2}{\|h_2\|_2} \right\|_2^2 = 2 - 2 \frac{|h_k^H h_l|}{\|h_k\|_2 \|h_l\|_2} \quad \text{[Math. 15]}$$

The invention claimed is:

1. A method for the relative positioning of a plurality of electronic apparatuses in communication with a communication device, the communication device establishing a set of communication channels through which the communication device exchanges electromagnetic signals with each of the electronic apparatuses, the method comprising:
   for each of the electronic apparatuses, estimating a vector, the elements of the estimated vector respectively representing transmission through said communication channels between the communication device and the respective electronic apparatus;
   for at least one pair of the electronic apparatuses comprising a first electronic apparatus and a second electronic apparatus, determining a minimum distance among the distances existing, for all the possible phase-shift values, between
      a first vector having a predetermined norm and colinear to the vector estimated for the first electronic apparatus, and
      a second vector having the predetermined norm, which is colinear to the vector estimated for the second electronic apparatus, and modified by application of a phase shift having a value among said possible values; and
   determining a position indicator for the first electronic apparatus as a function of the determined distance.

2. The positioning method according to claim 1, wherein, for each of the electronic apparatuses, the vector is formed of complex numbers, the module and argument of which represent the attenuation and phase, respectively, of the transmission through a respective one of the communication channels between the communication device and the respective electronic apparatus.

3. The positioning method according to claim 2, wherein the minimum distance is determined by the following formula:

$$d_{k,l}^*(h_k, h_l)^2 = 2 - 2 \frac{|h_k^H h_l|}{\|h_k\|_2 \|h_l\|_2} \quad \text{[Math. 16]}$$

with $d^*_{k,l}$ being said minimum distance and $h_k$ and $h_l$ being the vectors associated with the first electronic apparatus and the second electronic apparatus, respectively.

4. The positioning method according to claim 2, further comprising determining a distance matrix, at least certain elements of the distance matrix being the minimum distances respectively determined for said at least one pair of electronic apparatuses.

5. The positioning method according to claim 2, wherein said position indicator for the first electronic apparatus is a coordinate vector.

6. The positioning method according to claim 1, wherein the minimum distance is determined by the following formula:

$$d_{k,l}^*(h_k, h_l)^2 = 2 - 2 \frac{|h_k^H h_l|}{\|h_k\|_2 \|h_l\|_2} \quad \text{[Math. 16]}$$

with $d^*_{k,l}$ being said minimum distance and $h_k$ and $h_l$ being the vectors associated with the first electronic apparatus and the second electronic apparatus, respectively.

7. The positioning method according to claim 6, further comprising determining a distance matrix, at least certain elements of the distance matrix being the minimum distances respectively determined for said at least one pair of electronic apparatuses.

8. The positioning method according to claim 6, wherein said position indicator for the first electronic apparatus is a coordinate vector.

9. The positioning method according to claim 1, further comprising determining a distance matrix, at least certain elements of the distance matrix being the minimum distances respectively determined for said at least one pair of electronic apparatuses.

10. The positioning method according to claim 9, further comprising applying size reduction to said determined distance matrix.

11. The positioning method according to claim 10, wherein said position indicator for the first electronic apparatus is a coordinate vector.

12. The positioning method according to claim 9, wherein said position indicator for the first electronic apparatus is a coordinate vector.

13. The positioning method according to claim 1, wherein said position indicator for the first electronic apparatus is a coordinate vector.

14. The positioning method according to claim 1, wherein the first vector and the second vector are normalized in such a way that their associated predetermined norms are unitary.

15. A device for the relative positioning of a plurality of electronic apparatuses in communication with a communication device, the communication device establishing a set of communication channels through which the communication device exchanges electromagnetic signals with each of the electronic apparatuses, the positioning device comprising:
- one or more processors configured to:
    - estimate, for each of the electronic apparatuses, a vector, the elements of the estimated vector respectively representing transmission through said communication channels between the communication device and the respective electronic apparatus,
    - determine, for at least one pair of the electronic apparatuses comprising a first electronic apparatus and a second electronic apparatus, a minimum distance among the distances existing, for all the possible phase-shift values, between
        - a first vector having a predetermined norm and colinear to the vector estimated for the first electronic apparatus, and
        - a second vector having the predetermined norm, which is colinear to the vector estimated for the second electronic apparatus and modified by application of a phase shift having a value among said possible values, and
    - determine a position indicator for the first electronic apparatus as a function of the determined distance.

16. A communication system comprising:

the communication device provided with the positioning device according to claim 8, and said plurality of electronic apparatuses in communication with the communication device.

* * * * *